(12) United States Patent
Drean

(10) Patent No.: US 6,723,296 B2
(45) Date of Patent: Apr. 20, 2004

(54) MATERIAL AND METHOD FOR TREATING GASEOUS MEDIA CONTAINING VOLATILE ORGANIC COMPOUNDS

(75) Inventor: Henri Louis Drean, Paris (FR)

(73) Assignee: Ectium B.V., Amsterdam (NL)

(*) Notice: Subject to any disclaimer, the term of this patent is extended or adjusted under 35 U.S.C. 154(b) by 192 days.

(21) Appl. No.: 09/959,521

(22) PCT Filed: Apr. 25, 2001

(86) PCT No.: PCT/FR00/01080
§ 371 (c)(1),
(2), (4) Date: Apr. 10, 2002

(87) PCT Pub. No.: WO00/64577
PCT Pub. Date: Nov. 2, 2000

(65) Prior Publication Data
US 2003/0152505 A1 Aug. 14, 2003

(30) Foreign Application Priority Data
Apr. 27, 1999 (FR) .............................. 99 05321

(51) Int. Cl.[7] .............................................. B01J 20/02
(52) U.S. Cl. .................... 423/245.1; 502/174; 502/232; 502/80; 502/81; 502/413; 502/416
(58) Field of Search .................... 423/245.1, 240.5; 502/174, 232, 80, 81, 407, 413, 416

(56) References Cited

U.S. PATENT DOCUMENTS

| | | | | |
|---|---|---|---|---|
| 3,960,771 A | | 6/1976 | Tanaka et al. | |
| 4,054,537 A | * | 10/1977 | Wright et al. | 423/331 |
| 5,578,283 A | * | 11/1996 | Chen et al. | 423/240 R |
| 6,033,638 A | * | 3/2000 | Campbell et al. | 423/210 |
| 6,051,199 A | * | 4/2000 | Teller | 423/245.1 |
| 6,319,484 B1 | * | 11/2001 | Shore et al. | 423/245.1 |
| 6,503,469 B2 | * | 1/2003 | Izumi et al. | 423/210 |
| 2003/0104131 A1 | * | 6/2003 | Konno et al. | 427/376.2 |

FOREIGN PATENT DOCUMENTS

| | | |
|---|---|---|
| EP | 0 608 539 | 8/1994 |
| FR | 2 758 551 | 7/1998 |
| FR | 2 767 645 | 3/1999 |
| JP | 2-52040 | 2/1990 |
| WO | WO 98/39093 | 9/1998 |

* cited by examiner

Primary Examiner—Ngoc-Yen Nguyen
(74) Attorney, Agent, or Firm—Leydig, Voit & Mayer, Ltd.

(57) ABSTRACT

The invention relates to a material for treating gaseous media containing volatile organic components. According to the invention, the material is porous and exhibits an absorption capacity of approximately 20–30% in relation to the dry weight thereof, containing approximately 47–52% by weight of a composite carbon and silicon structure, approximately 12–20 wt. % carbon, approximately 5–7 wt % hydroxyl, and approximately 1–2 wt % oxygen. The invention can be used in atmospheric treatment for the preservation of living matter.

19 Claims, 4 Drawing Sheets

MATERIAL AND METHOD FOR TREATING GASEOUS MEDIA CONTAINING VOLATILE ORGANIC COMPOUNDS

FIELD OF THE INVENTION

This invention pertains to a material for the treatment of gaseous media containing volatile organic compounds, such as ethylene, as well as a process for the treatment of gaseous media using this material.

The invention also concerns a process and a device for obtaining the material.

This material and the associated treatment process are used for the treatment of atmospheres in which living materials are stored, particularly in refrigerators or coolers.

BACKGROUND

Ripening of living materials generates volatile organic compounds, such as ethylene, some of which cause autocatalysis of the ripening process. These compounds are also responsible for unpleasant odors, and usually generate microorganisms and contaminants such as bacteria, molds, and yeasts. Therefore, they are harmful to the proper storage of living materials because they can cause biological degradation, which is detrimental to storage and to consumer health.

These compounds are very light, and therefore they can circulate readily through ventilation or air conditioning systems.

In known storage systems, the atmospheres receive no particular treatment, and this results in a number of sanitary risks.

SUMMARY OF THE INVENTION

The purpose of the invention is to remedy these disadvantages by offering a material for the treatment of gaseous media containing volatile organic compounds and a treatment process using this material which allows for chemical transformation of the volatile organic compounds into harmless gases; the structure of this material makes this treatment process particularly effective.

Thus, the invention concerns a material for the treatment of gaseous media comprising volatile organic compounds, this porous material presenting an adsorption capacity of about 20 to 30% of its dry weight and comprising about 47 to 52 wt % of a composite structure of silicon and carbon, about 12 to 20 wt % carbon, about 5 to 7 wt % hydroxyl, and about 1 to 2 wt % oxygen.

It is preferable for this material to comprise a peripheral volume corresponding to essentially one-third of the total volume of the material, of about 75 to 85% porosities, with pores having dimensions between 10 and 50 Å and, in the remaining central volume, about 80 to 90% cavities whose dimensions are between about 200 Å and 2 $\mu$m.

It is preferable for the specific surface of the material according to the invention to be between 1200 and 2200 $m^2/g$.

The material may advantageously include about 20 wt % aluminum oxides and about 5 wt % iodides.

It is also advantageous for the relative humidity of this material to be less than 2 wt % with respect to the dry weight of the material.

The invention also concerns a process for the treatment of a gaseous medium containing volatile organic compounds, consisting of directing a flow of said gaseous medium over a porous material according to the invention, to bring about adsorption of this flow which penetrates the pores and the cavities of the material, in the process of which a chemical reaction occurs between the volatile organic compounds of the flow and the material itself, to transform the volatile organic compounds into nontoxic gases, particularly $CO_2$ and/or $SO_2$.

The process according to the invention is more effective when the porous material according to the invention presents a very high number of pores and cavities which allow diffusion of the gaseous flow throughout the material with a large specific surface. The chemical transformation of the gas flow is favored by the relatively long contact time between the gas flow and the material when the latter is penetrated by the flow.

Thus, the treatment process according to the invention provides a contact time between the gas flow and the material which is between 0.08 and 0.12 sec.

The invention also pertains to a device and a process for obtaining the material for the treatment of gaseous media according to the invention.

This process consists of:

preparing a clay base constituent comprising about 30 wt % clay with a particle size which is greater than 180 $\mu$m, and about 70 wt % clay with a particle size which is between 10 and 20 $\mu$m;

impregnating this base constituent with an aqueous solution containing about 10% by volume of acetic acid, between 5 and 10% by volume of citric acid, and between 15 and 20% by volume of hydrogen peroxide, the volume of the solution being essentially equal to the volume of the base constituent, applying a pretreatment of the base constituent impregnated with the solution by mixing it at a first predetermined speed to create a porous structure, mixing, at a pressure between 2 and 10 bar, the constituent which has been pretreated with an acidified liquid having a strong oxidizing potential, at a second speed lower than the first, to cause the liquid to penetrate the pretreated constituent and to form a gel, the quantity of pretreated constituent being between 42 and 48% of the total volume mixed, while the quantity of liquid is between 58 and 52% of the total volume mixed, mixing the gel with complementary products comprising a solution with a strong oxido-reductive potential representing about 10% of the total volume, a mixture of carbon and alumina representing about 12 to 15% of the total volume and calcium sulfate representing about 2% of the total volume drying the resulting mixture by ultrasound treatment of the material which has been mixed and transferred linearly, and pressing the dried material under a pressure of 8 to 10 bar.

It is preferable for the process according to the invention to be implemented continuously.

It is preferable if the process also consists of heating the base constituent impregnated with aqueous solution, at the time of pretreatment, to a temperature between 200 and 250° C.

The process of the invention also consists, advantageously, of emitting ultrasound waves at the time of this pretreatment, at a unit power of 2000 W and with an amplitude of 15 to 30 $\mu$m.

Heating and treatment by ultrasound waves contribute to the creation of a porous structure.

It is preferable, at the time of pretreatment, for the process to carry out another mixing operation at a third speed lower than the first and second speeds, to enlarge the cavities and porosities of the resulting structure.

The process according to the invention consists advantageously of filtering the liquid which results from the pretreatment of the preimpregnated base constituent.

The liquid associated with the pretreated constituent preferably comprises about 10% by volume of a solution with a strong oxidizing potential.

The pretreated constituent and the liquid are advantageously mixed by being heated to a temperature between 90 and 120° C.

The mixing of the gel and the complementary products is advantageously carried out at a temperature between 70° C. and 80° C.

The treatment with ultrasound to dry the mixture may advantageously be carried out over a length of 20 to 30 cm, under a specific output of 3 to 5000 W, an amplitude of 15 to 60 $\mu$m and a frequency of about 20 MHz.

The material is preferably dried under a partial vacuum of 120 to 150 mbar and at a temperature between 90 and 100° C.

Finally, the process according to the invention advantageously comprises a final stage of extrusion of the material.

The invention also pertains to a device for implementation of the production process according to the invention, which includes:

an impregnator comprising a first mixer turning at a speed between 1200 and 1400 rpm to form a first mixture, a first reactor comprising a second mixer turning at a speed between 800 and 1000 rpm to accomplish mixing under a pressure between 2 and 10 bar, to obtain a second mixture of the gel type;

a second reactor comprising a mixer for a third mixture;

a device which accomplishes linear transfer of the third mixture and at least one ultrasound device delivering a power of 3 to 5000 W, on at least one part of the trajectory of the third mixture, and a high-pressure extrusion device.

It is preferable for the impregnator of the device according to the invention to include a heating device which heats to a temperature between 200 and 250° C., as well as a device for the emission of ultrasound waves.

It is advantageous for the impregnator to be combined with a device for filtration of the liquid evacuated from the impregnator.

It is preferable for the impregnator to comprise another mixer turning at a speed between 500 and 800 rpm.

The first reactor advantageously includes a heating device for heating to a temperature between 90 and 120° C.

The second reactor advantageously includes a heating device for heating to a temperature between 70 and 80° C.

Finally, the device for linear transfer of the second reactor is advantageously made up of a double screw whose rotation speed is between 5 and 150 rpm.

Finally, the extrusion device preferable includes a variable screw which subjects the material from the first reactor to a pressure between 8 and 10 bar.

BRIEF DESCRIPTION OF THE DRAWINGS

The invention is more completely understood and its other purposes, advantages, and characteristics more clear upon reading of the following description related to the attached drawings which represent nonlimiting examples of embodiments of the invention, and in which:

FIG. 4 is a diagram showing the evaluation of the pressure and the viscosity in the first reactor illustrated in FIG. 1 and FIG. 3.

DETAILED DESCRIPTION

Figure 1:
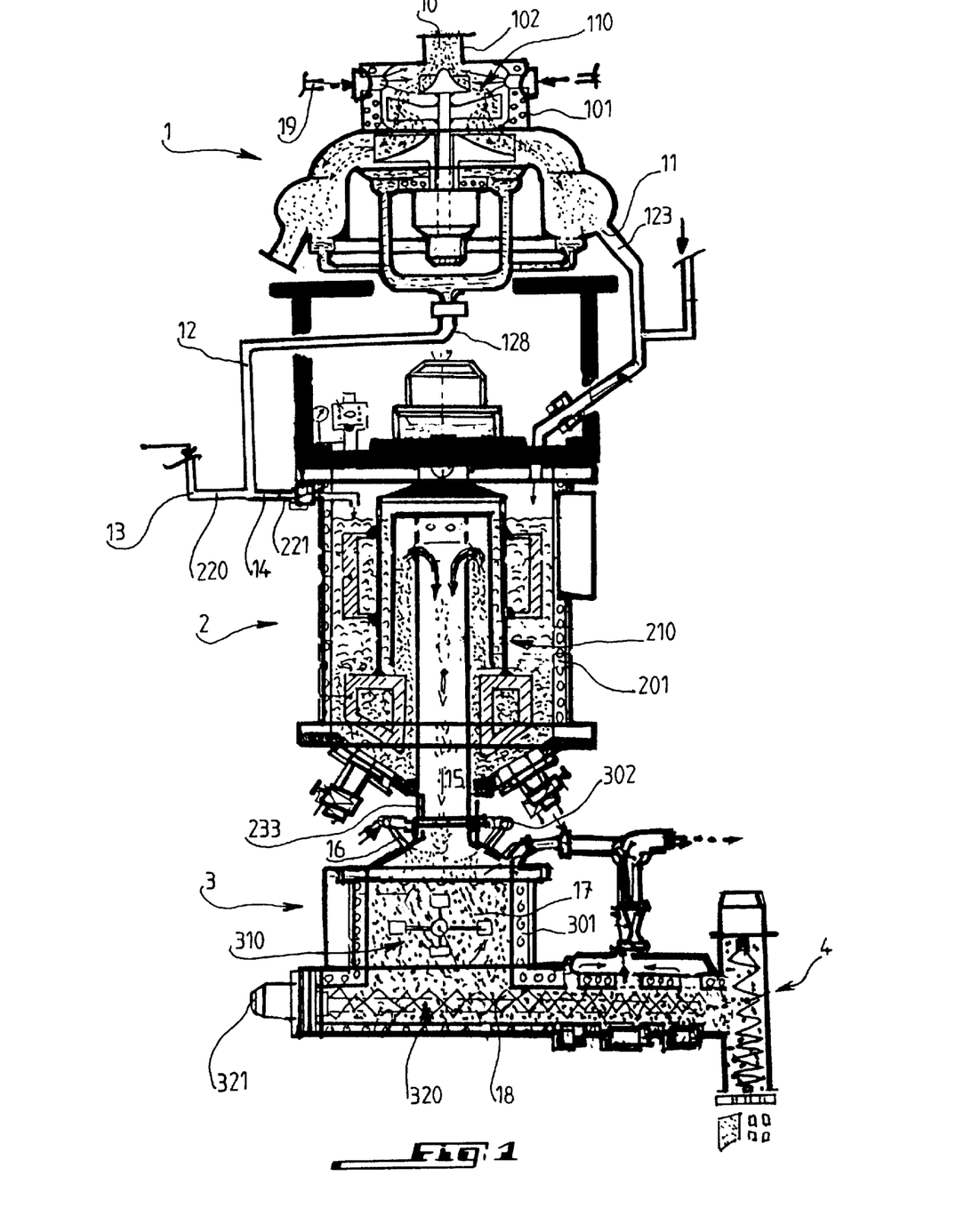
FIG. 1 is a cross section of the device for producing the material for the treatment of gaseous media according to the invention.

With reference to FIG. 1, the device according to the invention for producing material intended for the treatment of gaseous media generally includes an impregnator 1 which makes it possible to impregnate the base constituent of this material with an aqueous solution and to accomplish pretreatment to obtain a porous structure, a first reactor 2 to form a gel from the pretreated base constituent, and in which physicochemical reactions occur, and finally a second reactor 3 for drying the mixture obtained from the first reactor, and which ends with a device 4 for extrusion and shaping of the mixture from the second reactor.

Figure 2:
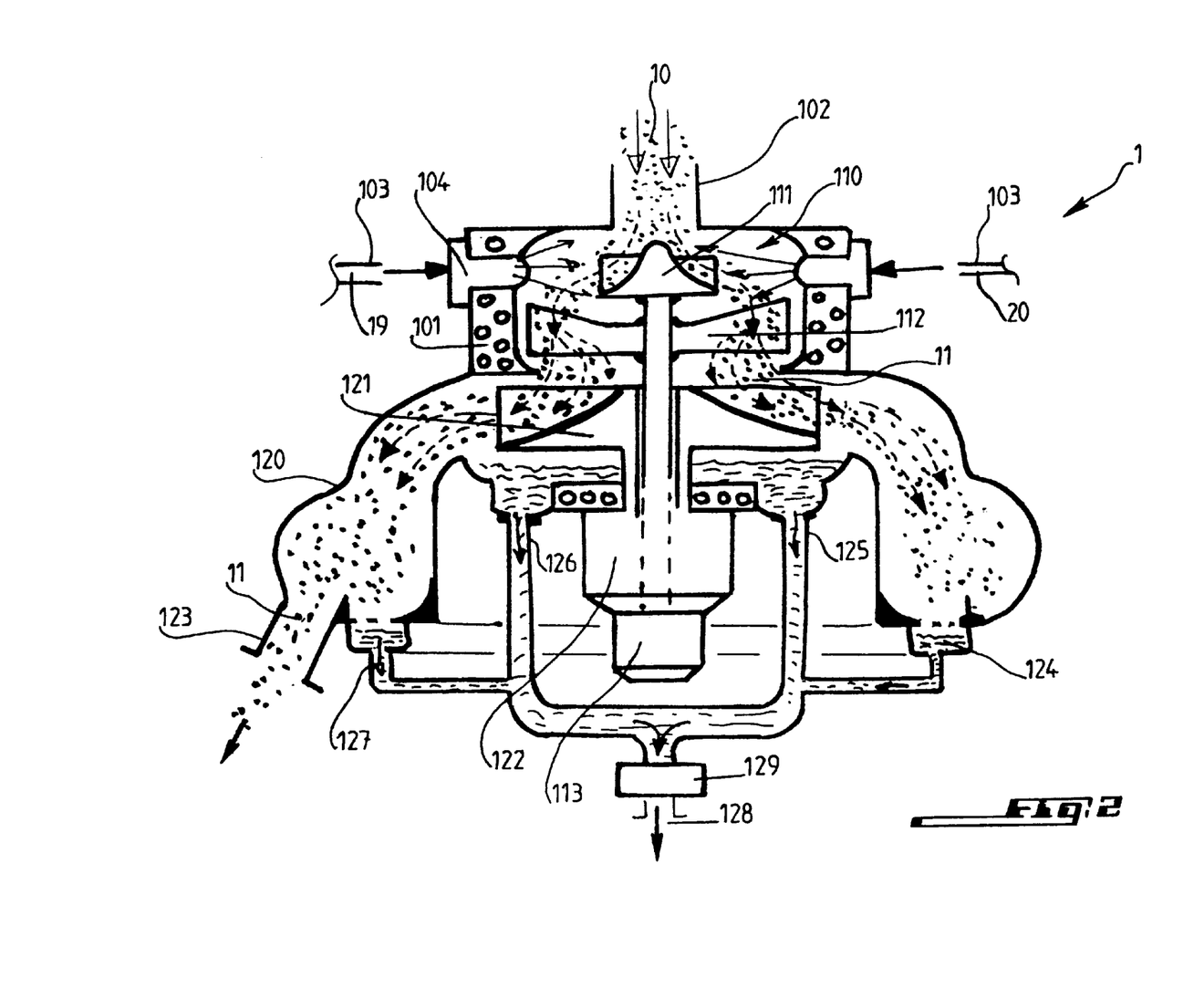
FIG. 2 is an enlarged cross section of the preimpregnator illustrated in FIG. 1.

FIG. 2 illustrates the impregnator 1, which is made up of a jacket 101, preferably heated to a temperature between 200 and 250° C., in which the base constituent 10 of the material to be obtained can be introduced through conduit 102.

In this jacket 101, a liquid 19 can also be introduced, for example, by means of injection nozzles 103.

This base constituent is clay and comprises about 30 wt % of clay having a particle size greater than 180 $\mu$m and about 70 wt % of clay having a particle size between 10 and 20 $\mu$m.

The liquid 19 is an aqueous solution comprising, by volume, 10% acetic acid, 5 to 10% citric acid, and 15 to 20% hydrogen peroxide.

The introduction of the material 10 and the liquid 19 is regulated so that the volume of aqueous solution and the volume of base constituent introduced into the jacket 101 are essentially equal.

The device 1 comprises, in the jacket 101, a first mixer 110 comprising a blade 111 and a blade 112, driven by a geared motor 113. It is preferable for the rotation speed of the blades 111 and 112 to be between 1200 and 1400 rpm.

This mixer 110 mixes the base constituent 10 and the aqueous solution 19, and the bell shape of the blade 111 transmits a high peripheral speed to the mixer 11.

Thus, in the enclosure 101, the base constituents, from which the metal atoms have been reduced, is restructured into light assemblies with high porosity with a large number of cavities and pores, favored by the ultrasound treatment. The blade 112 finalizes the molecular reorganization of the cavities and pores formed in this first mixture and makes them larger.

This loss of cohesion is favored by heating of the enclosure 101 and by the additional mechanical action of the ultrasound waves emitted by the means 104.

Preferably, this means 104 for emission of sound waves has a unit capacity of 2000 W and an amplitude of 15 to 30 $\mu$m, and these emissions are centered on the median part of the blade 111.

Thus, in the enclosure 101, the base constituents, from which the metal atoms have been reduced, is restructured into light assemblies with high porosity with a large number of cavities and pores, favored by the ultrasound treatment. The blade 112 finalizes the molecular reorganization of the cavities and porosities formed in this first mixture and makes them larger.

The impregnator 1 comprises another jacket 120 in which there is provided a blade 121 rotated by a geared motor 122, particularly at a speed between 500 and 800 rpm.

This blade 121 causes the mixture 11 to exit peripherally through the conduit 123.

The blade 121 allows a certain dispersion of the mixture, but in particular it transmits weaker binding forces to the molecular assemblies. This structural relaxation increases the sizes of the pores and cavities, and favors their impregnation by a diffusion of the preimpregnated material to the core.

The liquid, which is lighter than the mixture, is recovered in the conduits 124, 125, 126, and 127. These conduits all end at the removal loop 128.

On the removal loop 128, there is provided a filtration device 129 which filters out the recovered metal atoms by isotopic separation.

In fact, the clay base constituent contains metal ions in its atomic make-up, essentially iron, aluminum, chromium, manganese, and nickel, which are desirable to separate from the molecular assemblies, which should have as much capacity as possible to open into pores and cavities.

Returning to FIG. 1, the mixture 11 from the preimpregnator 1 is introduced into the first reactor 2 through the conduit 123.

The liquid 12 from the removal loop 128 of the impregnator 1 is also introduced into the first reactor 2, with a solution 13 having a strong oxidizing capacity brought by conduit 220. The liquid 14 which results from this mixture is introduced into the first reactor 2 through the conduit 221.

The solution 13 with a strong oxidizing capacity represents about 10% of the total volume of the liquid 14 introduced into the first reactor 2. The liquid 12 from the impregnator 1 is an acidified liquid.

In addition, among the materials introduced into the first reactor 2, the mixture 11 represents 42 to 48% of the total volume, while the liquid 14 represents between 58 and 52% of the total volume.

Figure 3:
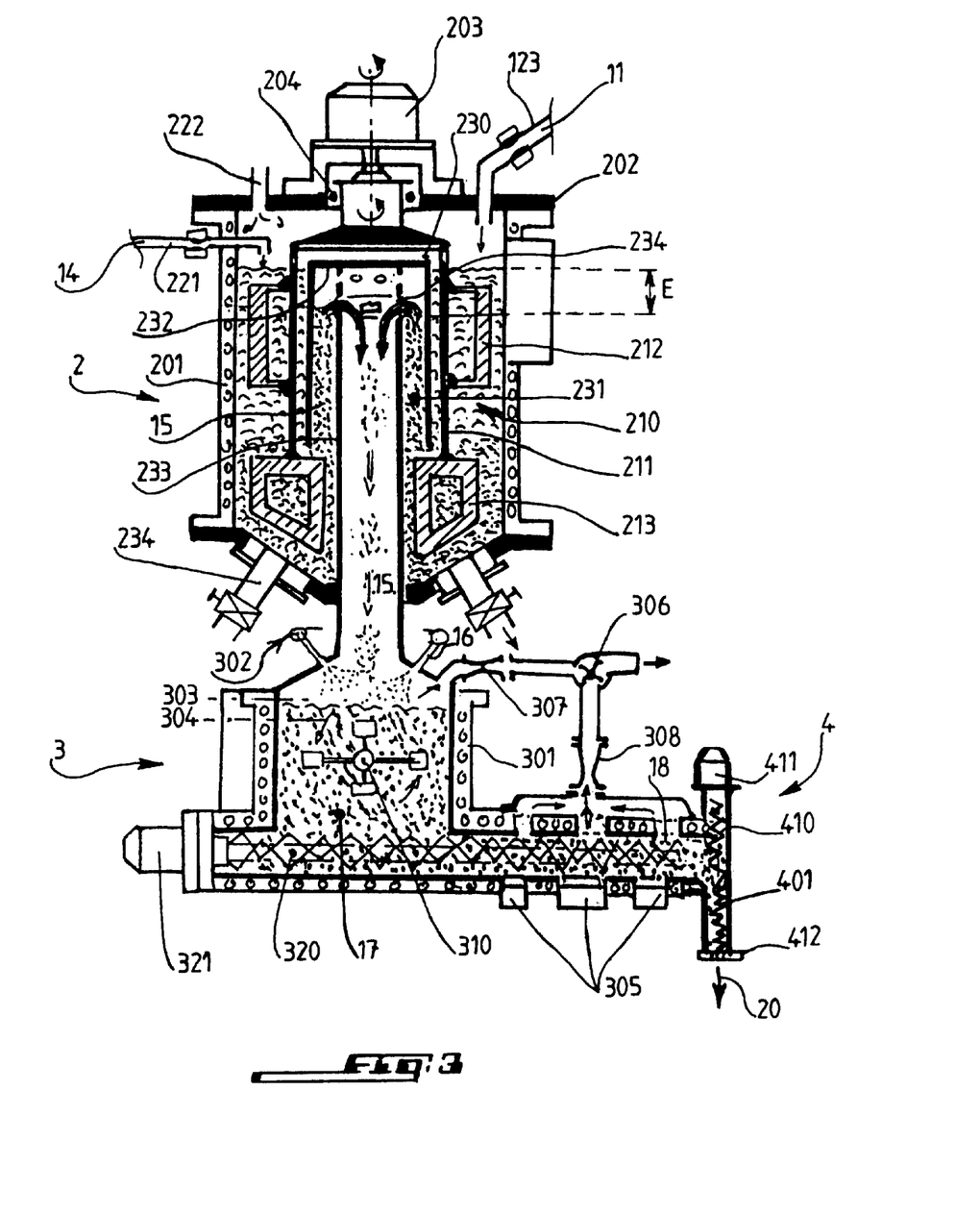
FIG. 3 is an enlarged view of the first and second reactors illustrated in FIG. 1.

Reference in now made to FIG. 3, which illustrates the first and second reactors, 2 and 3.

The first reactor 2 comprises an envelope 201, essentially cylindrical, which is closed on its upper part by a cover 202.

The cover 202 supports a geared motor 203, which drives mixer 210 by rotation.

The jacket 201 preferably comprises the means for heating to a temperature between 90 and 120° C.

The cover 202 is under pressure, because of an intake of gas under pressure through the conduit 222, and because of the sealing mechanism 204 between the motor 203 and the cover 202. The pressure in the enclosure 201 is preferably between 2 and 10 bar.

The mixer 210 comprises a barrel-shaped rotor 211 to which there is attached, on top, mixing blades 212 with a scissor effect and, on the bottom, streamlined blades 213.

Within the rotor 211, there are an external chamber 230 and an internal chamber 231, separated by a barrel-shaped element 232.

An evacuation tube 233 is provided within the internal chamber 231. The tube 233, the bell-shaped element 232, and the internal and external chambers are all concentric.

The mixture 11 and the liquid 14 introduced into the enclosure 201 are mixed vigorously by the blades 212 and 213 driven by the motor 203. The resulting mixture 15 progressively causes the formation of a gel, whose viscosity increases in the internal chamber 231.

The speed of the mixer 210 is between 800 and 1000 rpm.

The mixture 15 present in the internal chamber 231 then pours into the removal tube 233 through the overflow ports 234 presented by the tube on its upper part.

The resulting gel 15 is then transferred by gravity to the second reactor 3.

The first reactor 2 also comprises a drainage device 234 on its lower part.

Pressurization of the external chamber 230 is regulated by a level of deposit resulting from the distance between the level of the material between the external chamber 230 and the internal chamber 231, delimited by E.

The pressure regulates the time of the chemical reaction; the viscosity characterizes the transfer of the material in transit from the external chamber to the internal chamber.

Reference is now made to FIG. 4, which is a diagram showing, in schematic form, with the curve 5, the evolution of pressure inside the first reactor 1 and, with curve 6, the evolution of viscosity in the same reactor.

The transit time from the external chamber 230 to the exit of the internal chamber 231 is defined by the time interval (t1, t3), while the transit time in the internal chamber 231 is defined by the time interval (t2, t3).

The integral of the distance between the curves 5 and 6 for the transit time in the internal chamber is represented by the shaded surface 7. This integral defines the essential indicator for setting the parameters of the control system associated with the first reactor 2 which regulates pressurization, speed of the mixer 210, the transit times (t1, t3) and (t2, t3), as well as the viscosity $v_s$ at the exit of the lower chamber 231 prior to overflow into the tube 233.

This type of control characterizes the continuous operation of the first reactor 1, to assure the quality of the material produced.

Reference is made again to FIG. 3 to describe the second reactor 3.

This reactor includes a tank 301 into which the removal tube 233 for the gel 15 formed in the first reactor 2 empties.

At the upper part of the tank 301, additional products 16 are introduced, preferably by means of an introduction ring 302.

These additional products 16 include a solution with a strong oxido-reductive potential representing about 10% of the total volume introduced into the second reactor 3, a mixture of carbon and alumina representing about 12 to 15% of the total volume introduced, and calcium sulfate representing about 2% of the total volume introduced into the second reactor 3.

Inside the tank 301, the second reactor includes a mixer 310.

The tank 301 is preferably a heating tank, with its heating temperature being between 70 and 80° C.

The mixer 310 mixes the gel 15 and the additional products 16, the mixture 17 obtained being entrained by a double screw 320 which is provided on the upper part of the tank 301 of the second reactor 3.

This double screw, which rotates in opposite directions, is driven by a geared motor 321 fed by a speed variator (not shown) which drives the double screw 320 at a speed between 5 and 150 rpm, depending on the high and low levels, 303 and 304, of the mixture 17 in the reactor 3.

The double screw 320 transfers the mixture 17 along a linear trajectory from left to right on FIG. 3.

The second reactor 2 also includes the means 305 for emission of ultrasound waves, of the sonotrode type.

It is preferable for this means 305 to deliver a specific output of 3 to 5000 W, over a length of 20 to 30 cm, under an amplitude of 15 to 60 $\mu$m and with a frequency of approximately 20 MHz.

The temperature of the mixture 17 is then between 90 and 100° C.

At the time of this ultrasound treatment, the cavities and pores present in the mixture 17 are emptied and dried by diffusion in the microporous structure, which causes reimpregnation of the material 18 obtained by microscopic diffusion of the impregnation liquid progressively constituted from the preimpregnator 1 to the means of ultrasound emission 305.

This drying is favored by the application of a partial vacuum within the enclosure 301, this partial vacuum being between 120 and 150 mbar.

In particular, this partial vacuum can be obtained by an exhaust fan 306 which aspirates the gases inside the enclosure 301 through the nozzles 307, 308 to accelerate the circulation rates of the extracted gases.

Finally, the device according to the invention comprises an extruding device 4.

This device 4 comprises an enclosure 401 in which there is a screw 410 which is rotated by a geared motor 411.

Thus, the material 18 from the second reactor 3 is pressed onto the variable screw 410 up to a pressure between 8 and 10 bar. The flow rate of the material 20 coming from the extruding device 4 is between 14 and 20 kg/min.

The device 4 preferably includes a molding plate 412 so that the material 20 will be obtained in the form of granules or sheets, depending on the type of molding plate used.

Figure 5:
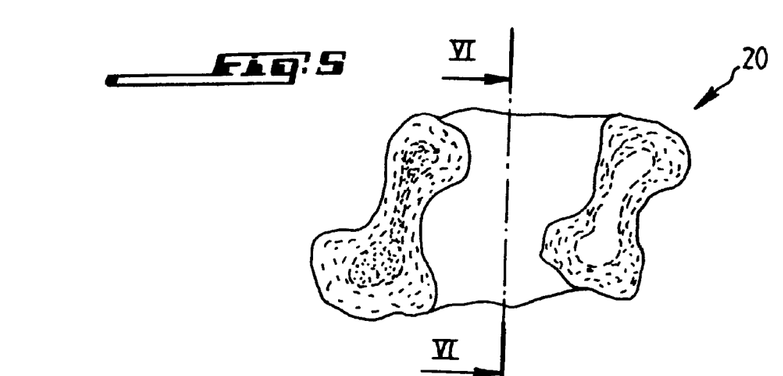
FIG. 5 is a perspective view of a piece of material according to the invention for the treatment of gaseous media.
Figure 6:
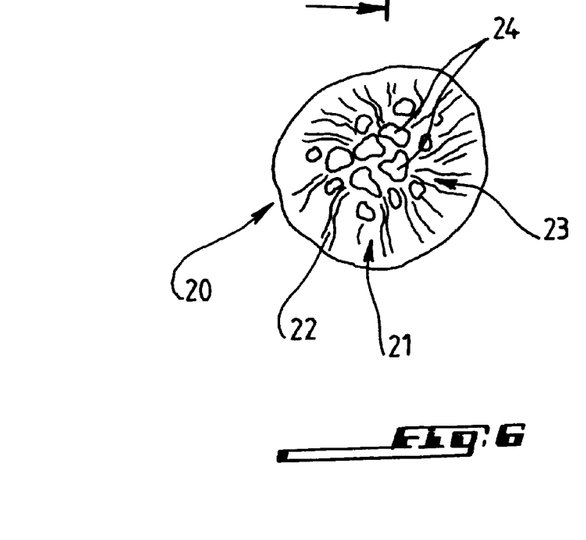
FIG. 6 is a cross-sectional view along VI—VI of FIG. 5.
Figure 7:
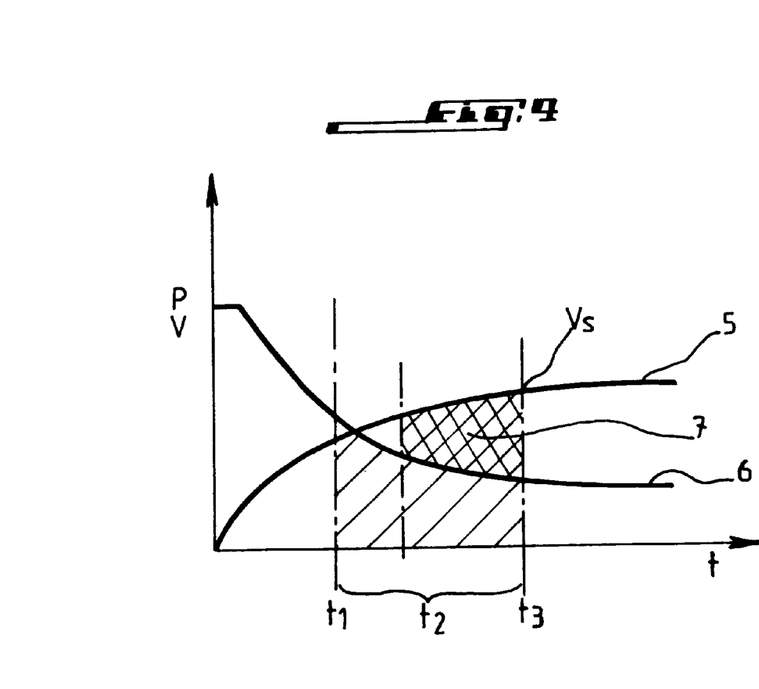

The material obtained at the exit of the extrusion device 4 is shown schematically in FIGS. 5 and 6.

The material 20 illustrated in FIGS. 5 and 6 is a porous material which includes about 47 to 52 wt % of a composite structure of silicon and carbon, about 12 to 20 wt % carbon, about 5 to 7 wt % hydroxyl, and about 1 to 2 wt % oxygen.

This material may also include about 20 wt % aluminum oxides and about 5 wt % iodides.

As shown in FIG. 6, this material comprises, in a peripheral volume 21 corresponding essentially to one-third the total volume of material, about 75 to 85% porosity including pores 22 having dimensions between 10 and 20 Å and, in the remaining central volume 23, about 80 to 90% cavities 24 whose dimensions are between about 200 Å and 2 $\mu$m.

Thus, since the pores 22 empty into the cavities 24 of the central volume, a gaseous flow can penetrate into the material through the pores 22 which constitute circulation routes, as far as cavities 24, in which the gaseous flow can swirl.

Therefore, the material 20 adsorbs a significant flow of gas circulating in the pores 22 and the cavities 24, then absorbs these gases by chemically transforming the volatile organic compounds present in this gas flow.

In general, these volatile organic compounds are transformed into nontoxic gases such as $SO_2$ and/or $CO_2$.

In particular, this material makes it possible to convert the ethylene present in a flow of carbon dioxide gas. Tests already conducted have demonstrated the efficacy of the porous material according to the invention.

The efficacy of treatment of the volatile organic compounds is greater when the porous material of the invention has an equally large specific surface, specifically between 1200 and 2200 $m^2$/g.

In addition, the large number of pores and cavities inside the porous material results in a relatively long contact time between the gas flow and the porous material when this flow penetrates it. In particular, this contact time can be between 0.08 and 0.12 sec.

Finally, the relative humidity of the porous material is advantageously less than 2% of the dry weight of the material.

This material has an absorption capacity on the order of 20 to 30% with respect to its dry weight, and it is particularly suitable for treatment of ethylene, ethylene dichlorides, ethylene oxides, aldehydes, and amines. It also neutralizes odors, particularly those resulting from hydrogen sulfide and other organic sulfides.

What is claimed is:

1. A porous material for the treatment of gaseous media containing volatile organic compounds, the porous material presenting an adsorption capacity of about 20 to 30% with respect to its dry weight and comprising about 47 to 52 wt % of a composite structure of silicon and carbon, about 12 to 20 wt % carbon, about 5 to 7 wt % hydroxyl, and about 1 to 2 wt % oxygen.

2. The material according to claim 1, wherein essentially about one-third of the total volume of the material is peripheral volume and the remaining volume is central volume, and the peripheral volume has a porosity of about 75 to 85% from pores with dimensions between 10 to 50 Å and the central volume is about 80 to 90% cavities having dimensions between about 200 Å and 2 $\mu$m.

3. The material according to claim 1, having a specific surface of between 1200 and 2200 $m^2$/g.

4. The material according to claim 1, comprising about 20 wt % aluminum oxides and about 5 wt % iodides.

5. The material according to claim 1, having a relative humidity lower than 2% of its dry weight.

6. A process for the treatment of a gaseous medium containing volatile organic compounds, consisting of directing a flow of the gaseous medium over the porous material according to claim 1, to cause adsorption of the flow, which penetrates the pores and the cavities of the material, during which a chemical reaction occurs between the volatile organic compounds of the flow and the material, to transform the volatile organic compound into nontoxic gases.

7. The process according to claim 6, in which contact time between the gaseous flow and the material is between 0.08 and 0.12 sec.

8. The process for obtaining a porous material according to claim 1 comprising:

preparing a base constituent of clay comprising about 30 wt % of a clay with a particle size greater than 180 $\mu$m and about 70 wt % of a clay with a particle size between 10 and 20 $\mu$m, impregnating the base constituent with an aqueous solution comprising about 10% by volume of acetic acid, between 5 to 10% by volume of citric acid, and between 15 and 20% by volume of peroxide, wherein the volume of the solution is essentially equal to the volume of the base constituent, pretreating the base constituent impregnated with the aqueous solution by mixing at a first speed to create a porous structure, mixing, under a pressure between 2 and 10 bar, the base constituent, after pretreating with a second solution comprising an acidified liquid and a solution with a strong oxidizing potential, at a second speed lower than the first speed, to cause the second solution to penetrate the pretreated constituent and to form a gel, wherein the pretreated constituent is between 42 and 48% of the total volume mixed, while the second solution is between 58 and 52% of the total volume mixed;

mixing the gel with a mixture, wherein the mixture comprises, based on the total volume of the mixture, 10% by volume of a solution with a strong oxidoreductive potential, 12 to 15% by volume of a combination of carbon and alumina, and about 2% by volume of calcium sulfate to form a product; drying the product by utltrasound treatment, and pressing the product, after drying, under a pressure between 8 and 10 bar.

9. The process according to claim 8, wherein the process is carried out continuously.

10. The process according to claim 8, including heating the base constituent impregnated with the aqueous solution in pretreating, at a temperature between 200 and 250° C.

11. The process according to claim 8, including applying ultrasound waves at pretreating, at a unit power of 2000 W and with an amplitude of 15 to 30 $\mu$m.

12. The process according to claim 8, including, in pretreating, mixing at a third speed, lower than the first and second speeds, to enlarge the cavities and pores.

13. The process according to claim 8, including filtering to remove liquid from the base constituent after the pretreating.

14. The process according to claim 8, in which the second solution comprises about 10% by volume of the solution with a strong oxidizing potential.

15. The process according to claim 8, including mixing the base constituent, after pretreating, and the second solution while being heated to a temperature between 90 and 120° C.

16. The process according to claim 8, including mixing of the gel at a temperature between 70 and 80° C.

17. The process according to claim 8, wherein the ultrasound treatment to dry the product is carried out at a length of 20 to 30 cm, under a specific output of 3 to 5000 W, an amplitude of 15 to 60 $\mu$m, and a frequency of about 20 MHz.

18. The process according to claim 8, including drying the product under a partial vacuum of 120 to 150 mmbar and at a temperature between 90 and 100° C.

19. The process according to claim 8, wherein the pressing, after drying, is carried out by extruding the product.

* * * * *

UNITED STATES PATENT AND TRADEMARK OFFICE
CERTIFICATE OF CORRECTION

PATENT NO. : 6,723,296 B2 Page 1 of 1
DATED : April 20, 2004
INVENTOR(S) : Henri Louis Drean It is certified that error appears in the above-identified patent and that said Letters Patent is hereby corrected as shown below:

<u>Title page,</u>
Item [22], PCT filed, should read -- Apr. 25, 2000 --

Signed and Sealed this

Fourteenth Day of September, 2004

JON W. DUDAS
*Director of the United States Patent and Trademark Office*